United States Patent [19]

Brandt

[11] Patent Number: 4,815,223
[45] Date of Patent: Mar. 28, 1989

[54] SNOW GROOMING VEHICLE AND ATTACHMENTS

[75] Inventor: Claude R. Brandt, Glens Falls, N.Y.

[73] Assignee: West Mountain Sales, Inc., Glens Falls, N.Y.

[21] Appl. No.: 140,482

[22] Filed: Jan. 4, 1988

[51] Int. Cl.$^4$ .............................................. E01C 19/23
[52] U.S. Cl. ...................................... 37/224; 172/173
[58] Field of Search ........................ 37/222, 223, 224; 172/149–151, 154, 158, 168, 170, 172, 173, 174, 175, 184

[56] References Cited

U.S. PATENT DOCUMENTS

| | | |
|---|---|---|
| 873,919 | 12/1907 | Arnold . |
| 1,139,388 | 5/1915 | Weed . |
| 1,560,225 | 11/1925 | Filleul . |
| 1,632,674 | 12/1924 | Pearson . |
| 2,055,176 | 9/1936 | Lang .................................. 37/224 |
| 3,025,899 | 1/1961 | Gregson . |
| 3,093,423 | 6/1963 | Adams .................................. 305/56 |
| 3,434,557 | 3/1969 | Paramythoti .................... 37/224 |
| 3,450,013 | 6/1969 | Peterson ............................ 37/224 |
| 3,484,140 | 12/1969 | Grenier . |
| 3,497,271 | 2/1970 | Keller .................................. 305/13 |
| 3,510,174 | 5/1970 | Lamb .................................. 305/56 |
| 3,652,106 | 3/1972 | Waterman ........................ 37/224 |
| 3,841,167 | 10/1974 | Reedy .................................. 305/58 |
| 4,089,565 | 5/1978 | Loegering ........................ 305/45 |
| 4,523,873 | 6/1985 | Elliot .................................. 37/224 |

OTHER PUBLICATIONS

"Grouser Products Over the Tire Products by Grouser" Advertising Literature, 8 pages, 12/83.
"New Change in Chains", Tractioneer Co. Adv. Literature, 8 pages, Jan. 1985.

Primary Examiner—Eugene H. Eickholt
Attorney, Agent, or Firm—William P. O'Meara

[57] ABSTRACT

A vehicle for use in ski-area snow grooming operations and also for use in summer maintenance operations which is provided with a four-wheel hydrostatic-drive transmission and four-wheel steering. The vehicle has a frame/body/engine assembly which provides a centrally located low center of gravity and high operator visibility. The vehicle has a relatively broad wheel base which is further broadened by mounting of at least four snap-on wheels. A wrap-around cleat assembly is mountable on each of four multiple-wheel sets for increasing traction in snow. An engine-driven snow processing apparatus operable in both a snow blading state and a snow compacting state is provided.

7 Claims, 6 Drawing Sheets

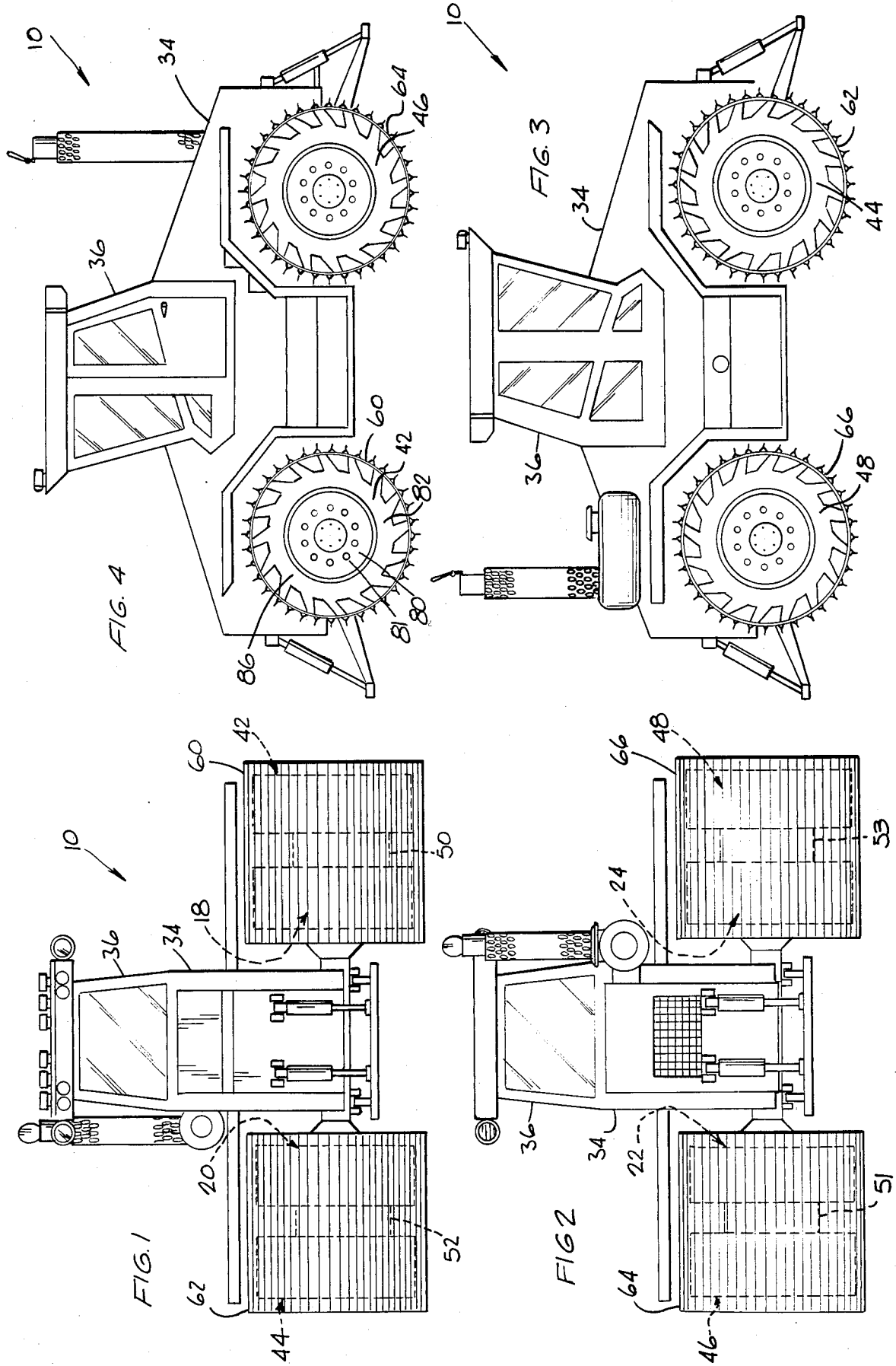

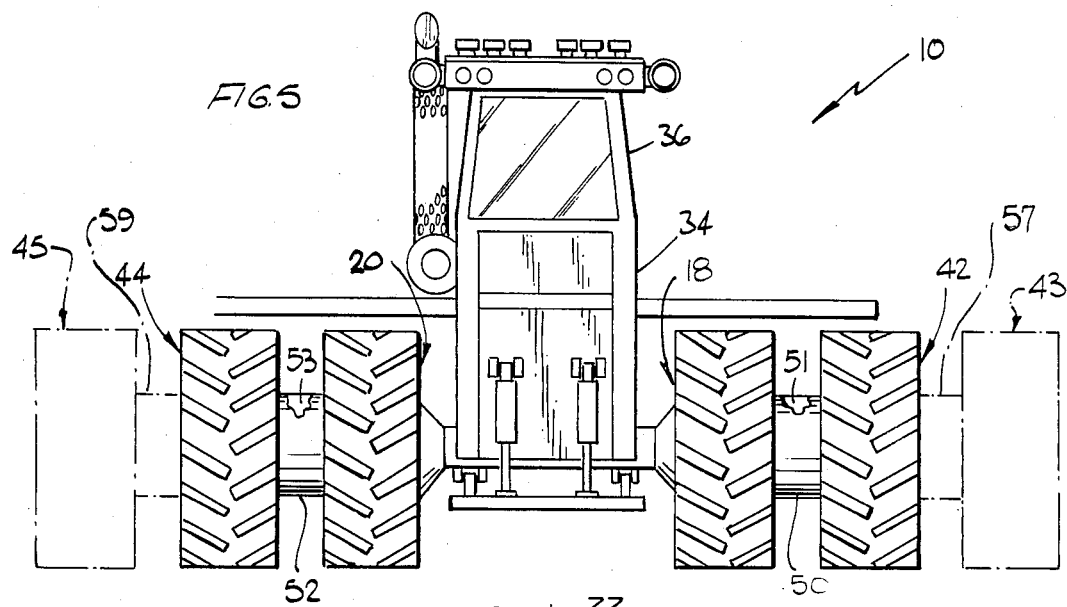
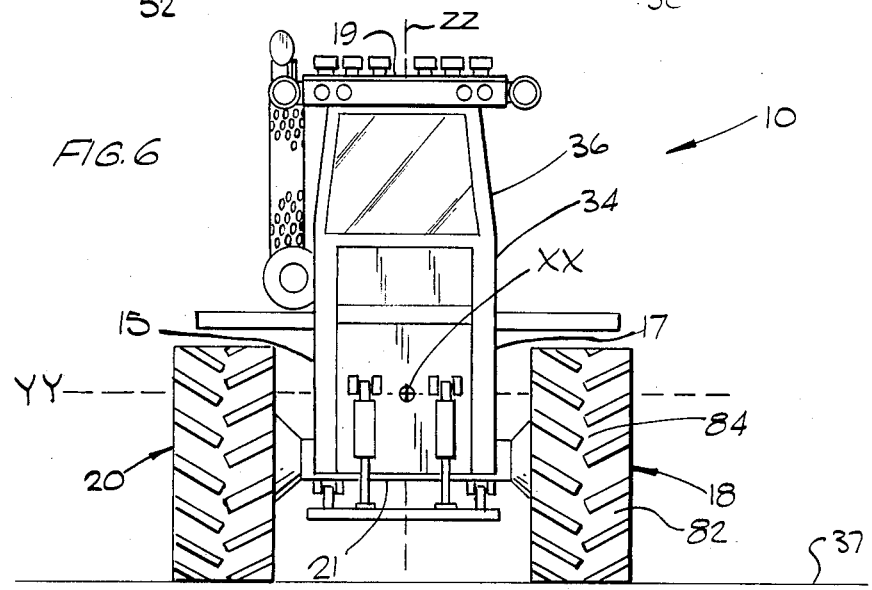
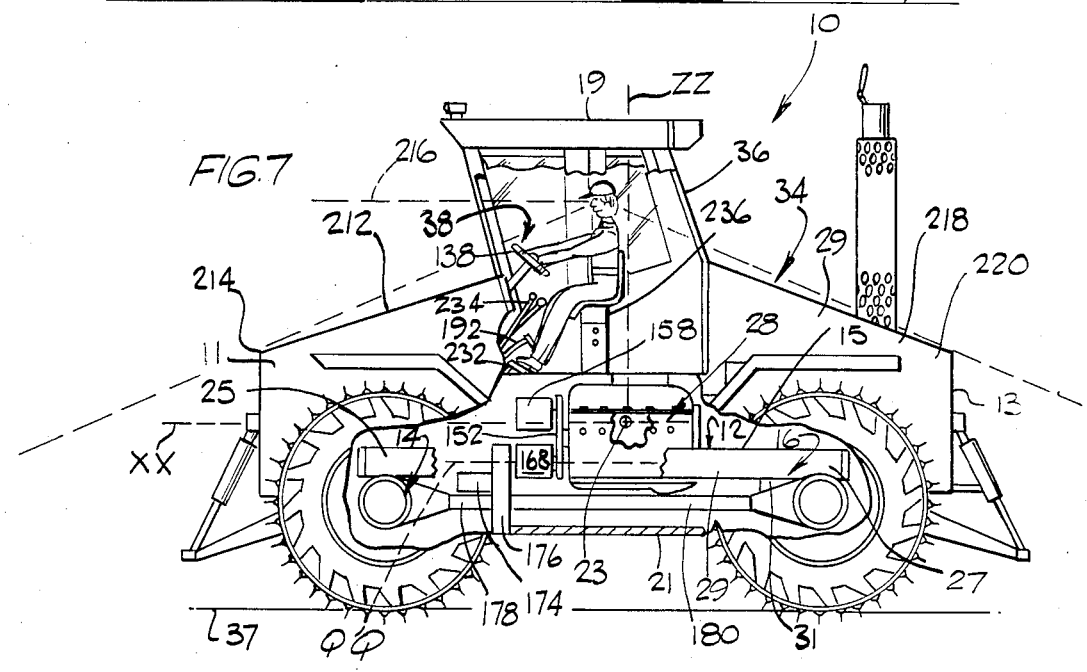

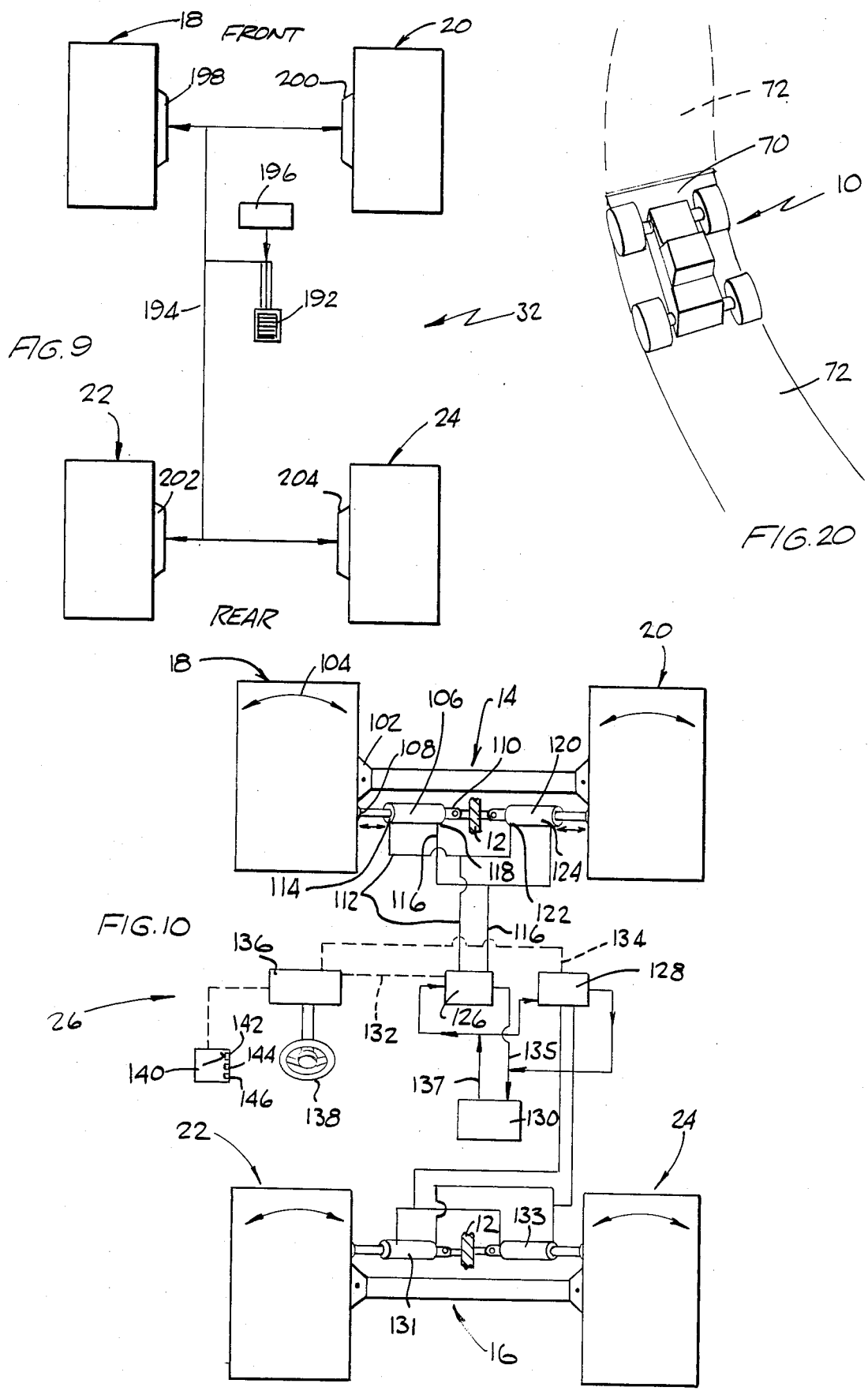

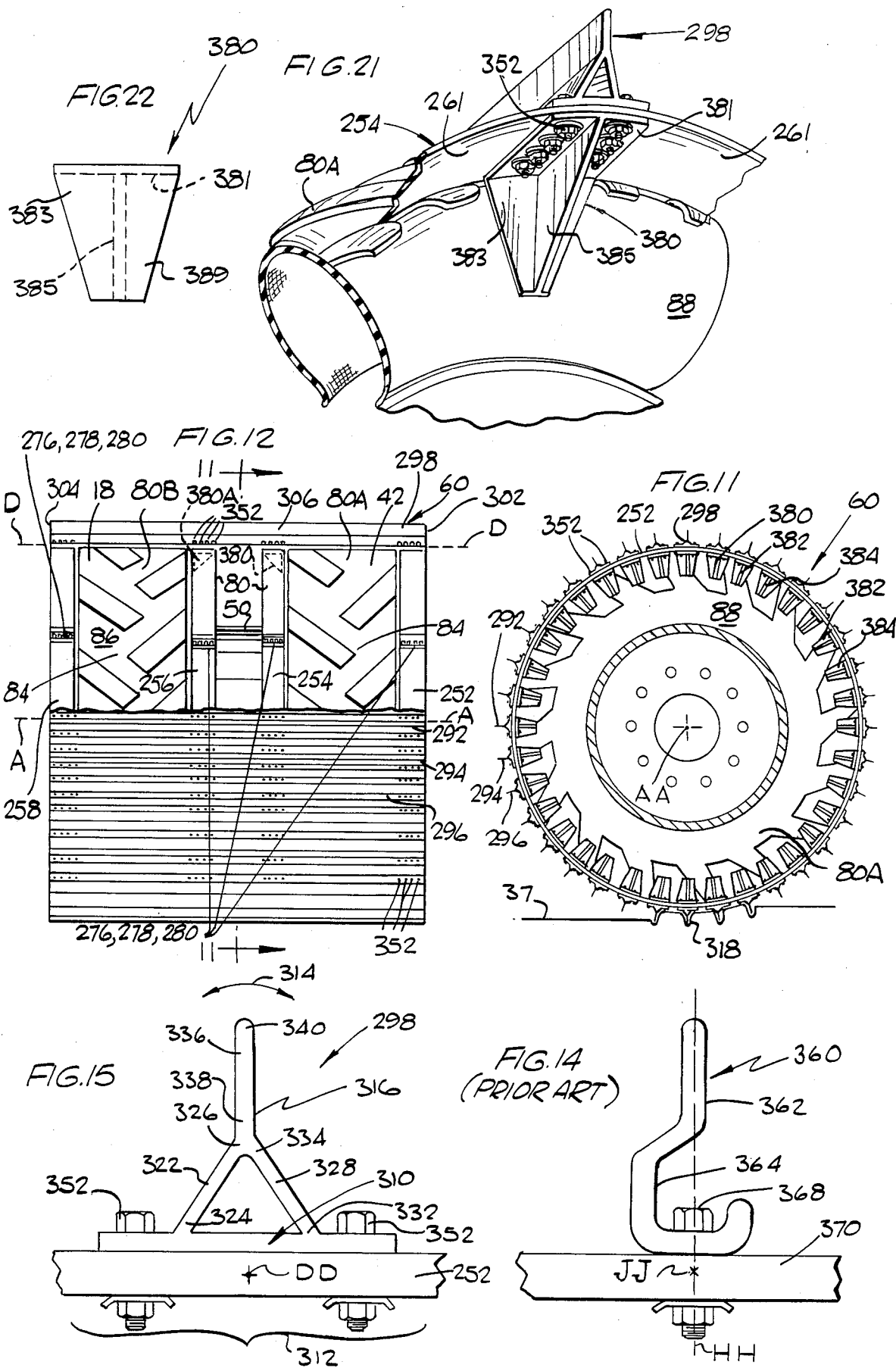

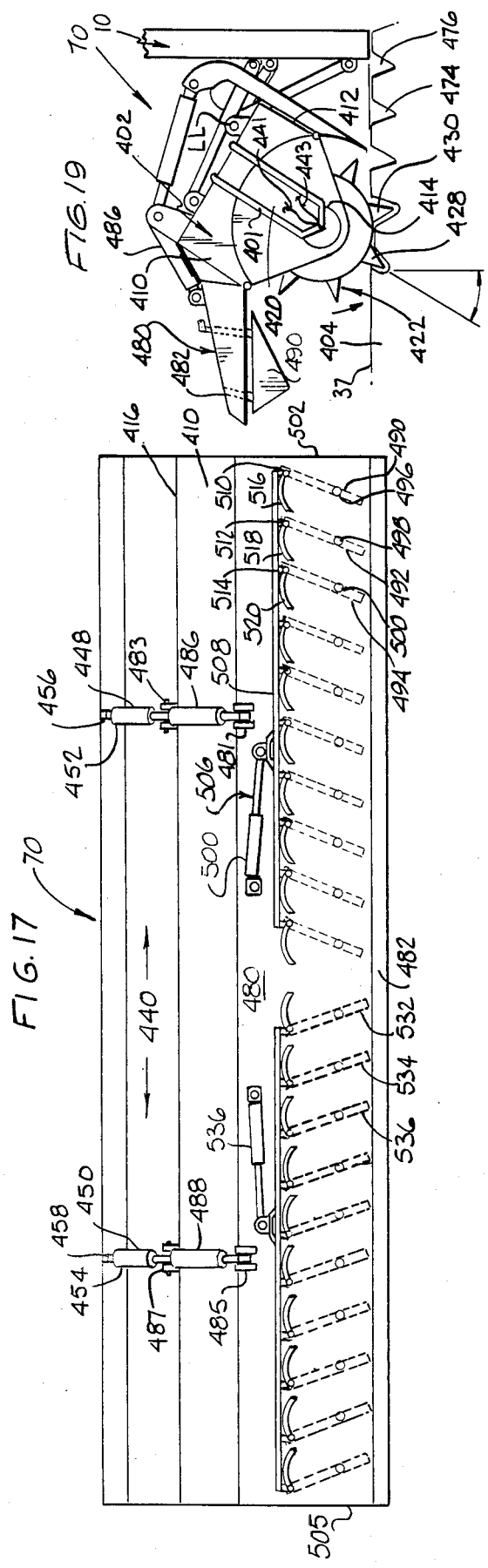
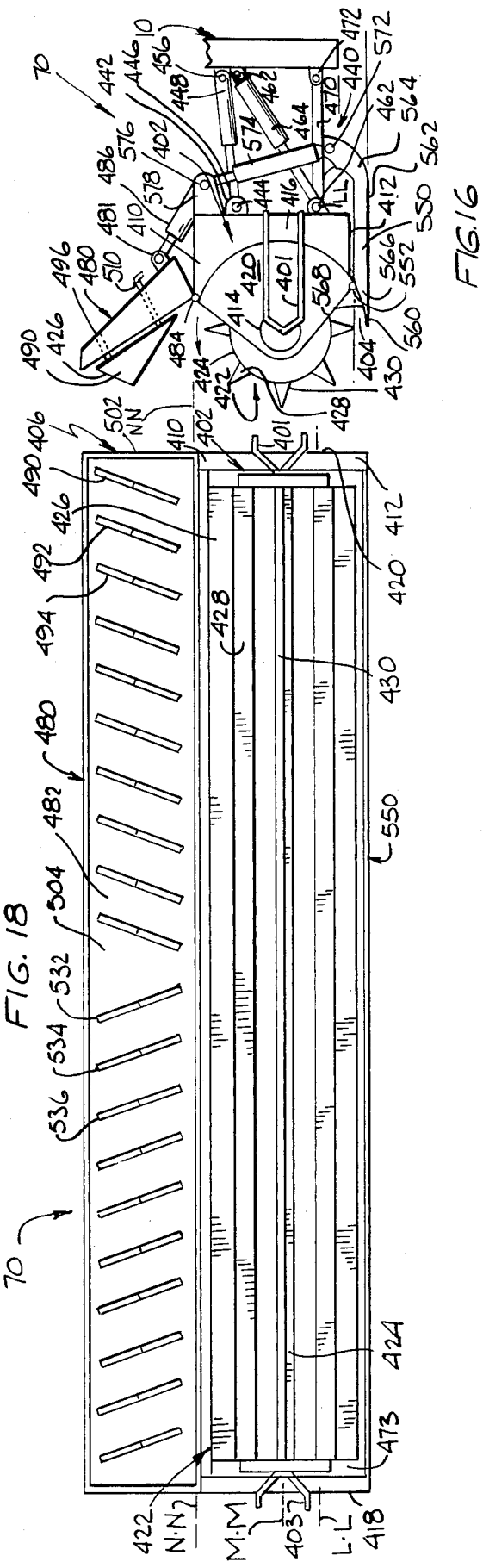

SNOW GROOMING VEHICLE AND ATTACHMENTS

BACKGROUND OF THE INVENTION

The present invention relates generally to snow grooming equipment and, more particularly, to a wheel-driven snow grooming vehicle and snow-processing and traction-increasing attachments therefor.

All major ski areas in the United States rely on power-driven snow grooming vehicles for maintaining desirable skiing conditions. One common operation performed by such snow grooming vehicles is mogul leveling. Moguls are small, steep, hard-packed snow mounds which are created, especially on steep terrain, by skiers turning at the same location. During a mogul leveling operation, these steep mounds are bladed down and the snow in the mounds is redistributed to provide a more uniform skiing terrain. A similar operation is performed on narrow ski trails which tend to become "dished out" from ski traffic, i.e. the snow becomes relatively low towards the center of and relatively high towards one or both sides of the trail, especially in areas where the trail turns. As a result, it is necessary for snow grooming vehicles to move snow from the sides of a trail back towards the center. Another operation performed by snow grooming vehicles is packing of newly-fallen snow to create a firm base surface for skiing.

At the present time, nearly all snow grooming vehicles are track-driven or "crawler-type" tractors. One problem with such track-driven tractors is that they are extremely expensive to operate and maintain as compared to wheeled vehicles. For example, a typical track-driven snow grooming vehicle may cost on the order of $40 per hour to maintain and operate, whereas a wheel-driven tractor of comparable power would typically cost on the order of $10 per hour to maintain and operate. Track maintenance is a significant portion of the operating expense for track-driven vehicles. Another problem with track-driven vehicles is that they are generally not suitable for off-season work. The vehicle tracks tend to damage fragile mountain terrain and also damage road and other hard surfaces. In addition, the vehicle tracks themselves are relatively fragile and are easily damaged by operation on surfaces other than snow.

In spite of these drawbacks of track-driven snow grooming vehicles, no wheel-driven tractor has, to date, met with success in snow grooming operations. Wheel-driven tractors that are presently sold for snow grooming operations are adaptations of conventional articulated-frame, agriculture-type tractors which are provided with chain-wrapped flotation tires. It is applicant's belief that there are a number of reasons for the lack of success of such vehicles which have not heretofore been appreciated by the manufacturers or purchasers of such vehicles.

One problem is the inherent instability of an agricultural-type tractor in mountainous terrain. Agricultural tractors usually have a relatively high center of gravity because of an elevated engine placement for avoiding dust, etc. Agricultural tractors generally also have a forwardly-mounted engine placement for balancing out a rear vertical load applied to a tractor rear hitch portion by a pulled agricultural implement such as a plow, etc. In addition, large agricultural tractors are generally provided with articulated frames to facilitate relatively short-radius turns. All of these features, i.e. a high center of gravity, a forwardly-positioned center of gravity, and an articulated frame, create stability problems in steep-terrain operation. An articulated frame causes a lateral momentum shift and wheel base shortening during turning operations which tends to overturn a vehicle, especially when it is moving generally perpendicularly to the slope or "fall line" of a hill in steep-terrain. A high center of gravity of course inherently causes instability, and a forwardly-positioned center of gravity significantly increases instability when the vehicle is traveling in a downhill direction.

Another problem with agricultural tractor designs is that such designs generally do not provide good visibility both forwardly and rearwardly of the vehicle. Such visibility in both the forward and rearward directions is extremely important in snow grooming operations. An operator must constantly adjust to changing terrain and thus must be provided with a clear forward view. The operator must also be able to observe the effect that his snow grooming operations have provided and thus must have a clear rear view.

Another problem associated with agricultural tractor design is that such tractors are intentionally built from extremely massive components for the purpose of providing good traction in flat field-type conditions. The engine power needed for moving this large tractor mass and the mass of towed implements is relatively low in flat-surface type operating conditions. In flat-surface operation, engine power must only overcome the effects of inertia. Since rapid acceleration is not required in tractors' operation, engine power requirements are low. However, in steep-terrain operating conditions, weight substantially increases the tractor engine power requirements, since the tractor engine must, in steep terrain, move the mass of the tractor and the mass of any attached implements against a sizeable component of the force of gravity.

A further drawback of conventional agricultural tractor design is that the standard manual transmissions and standard automatic transmissions provided in such vehicles tend to jerk and cause loss of traction when a gear shift is performed in steep-terrain operating conditions.

Another problem with wheel-driven tractors in snow grooming operations is that flotation wheels provided with chains which are used by such vehicles to increase traction are simply incapable of providing the traction which is generated by the track of a conventional crawler-type snow grooming vehicle. A related problem is that most flotation tire chains require several hours to install. This is a major impediment when the vehicle is to be used for road and parking-lot maintenance as well as slope maintenance because chains generally provide poorer traction in hard surface operating conditions and tend to damage such surfaces.

A problem relating to snow grooming generally is that most snow grooming equipment relies on the traction provided by the snow grooming vehicle for operation. For example, a snow grooming vehicle used to level a mogul field is usually simply provided with a fixed blade mounted on the front of the vehicle. Such a blade is effective when the vehicle is moving downhill, and the driving traction of the vehicle is augmented by the force of gravity. However, in situations when the vehicle is moving in an uphill direction and the force of gravity is acting against the direction of vehicle traction, the traction which is generated by the snow grooming vehicle is often insufficient to accomplish the task at hand. Thus, a vehicle operator is forced to initially drive his vehicle to the top of a slope and then performs most snow grooming operations while the vehicle is moving downhill. A related problem is that in certain extremely steep terrain it is dangerous to operate a snow grooming vehicle in a downhill direction. Thus, in many ski areas, some of the steepest terrain is never groomed at all.

OBJECTS OF THE INVENTION

It is an object of the present invention to provide a wheel-driven snow grooming vehicle adapted for wintertime ski-area snow grooming operations.

It is another object of the present invention to provide a wheel-driven snow grooming vehicle for use in ski area, etc., summertime maintenance operations.

It is another object of the present invention to provide a wheel-driven snow grooming vehicle having four-wheel drive and four-wheel steering.

It is another object of the present invention to provide a wheel-driven snow grooming vehicle having snap-on wheels for providing four dual-wheel pairs.

It is another object of the present invention to provide a wheel-driven snow grooming vehicle having four dual-wheel pairs and having a plurality of snow-gripping cleats provided for each dual-wheel pair by a rapidly attachable and rapidly removable wrap-track assembly.

It is another object of the present invention to provide a wheel-driven snow grooming vehicle having a rigid chassis.

It is another object of the present invention to provide a wheel-driven snow grooming vehicle having a hydrostatic transmission.

It is another object of the present invention to provide a wheel-driven snow grooming vehicle having good operator visibility characteristics, both forwardly and rearwardly of the vehicle.

It is another object of the present invention to provide a wheel-driven snow grooming vehicle having a relatively low, longitudinally and laterally centered, center of gravity and a relatively large wheel base for providing vehicle stability.

It is another object of the present invention to provide a wheel-driven snow grooming vehicle having good ground clearance.

It is another object of the present invention to provide a wheel-driven snow grooming vehicle having a relatively high power-to-weight ratio.

It is another object of the present invention to provide a cleat assembly for mounting in encircling relationship about single or axially-aligned groups of vehicle tires for snow maintenance and similar operations.

It is another object of the present invention to provide an efficient cleat design for a tire-wrappable cleat assembly.

It is another object of the present invention to provide a snow processing unit for processing snow along a snow processing path traversed by a snow grooming vehicle which has a first operating state for redistributing snow from the snow processing path to selected positions adjacent the path and which has a second operating state for compacting snow within the snow processing path.

It is another object of the present invention to provide a snow processing apparatus which is mountable on a snow grooming vehicle and which receives operating power from the snow grooming vehicle drive assembly.

SUMMARY OF THE INVENTION

The present invention is directed to a wheel-driven vehicle which is designed especially for mountain snow grooming operations and which is also useful for summer maintenance work. The vehicle has a four-wheel drive hydrostatic transmission and four-wheel steering. The vehicle engine is centrally mounted at a relatively low position to provide a low, centrally positioned vehicle center of gravity. The vehicle body has a relatively raised operator cab and relatively lowered front and rear hood portions to provide good operator visibility in both a forward and rear direction. The vehicle has a relatively high power-to-weight ratio and uses engine power rather than vehicle traction to power snow processing attachments.

The vehicle has a relatively broad wheel base which is further broadened for snow grooming operation by four or more snap-on wheel units which are rapidly mountable on each of the vehicle normal-use wheels to provide four dual-wheel sets or, if desired, four three-wheel sets. The multiple-wheel sets increase vehicle flotation on the snow as well as broadening the wheel base for added stability. The wheel-tire assemblies used have relatively large diameters and provide good clearance, e.g. 1 to 1.5 ft., between the vehicle and the snow or other base surface.

The vehicle traction is increased by mounting of a unique track-like cleat assembly, referred to herein as a "wrap-track", in circumscribing relationship about each individual multiple-wheel set. The wrap-tracks, because they are well-supported by the associated underlying wheel sets, are much less subject to maintenance problems than the tracks of a traditional crawler-type snow grooming vehicle. The wrap tracks also have a unique cleat configuration which is less subject to rolling movement during snow penetration and subsequent tractional snow engagement than currently used cleat configurations of crawler-tractor tracks. The underlying multiple-wheel sets also tend to stabilize the cleats to prevent rolling movement thereof. A highly efficient snow engagement and thus increased traction is provided as a result of these cleat stabilizing features because the cleats penetrate the snow without disturbing lateral crystalline bonds existing between snow particles and may thus subsequently exert a much greater lateral force against the penetrated snow than conventional cleat configurations which roll during snow penetration and disturb lateral crystalline bonds between snow particles.

The vehicle's snow processing ability is enhanced by use of a unique snow processing attachment which relies on vehicle engine power rather than vehicle traction for its operating impetus. The snow processing apparatus may be operated in a first "blading" position for breaking up and redistributing hard-packed snow such as found in mogul fields. In this operating position, the snow processing apparatus may be caused to "bite" relatively deeply or relatively shallowly into the snow through operator-selective operation of a depth control device. The snow is moved by a rotating paddle wheel-like assembly. The direction in which the snow is moved during a blading operation is also operator-selectable. The snow processing apparatus may also be operated in a second compacting position in which the rotating paddle wheel-like rotating assembly, moving at a surface speed about equal to vehicle speed, penetrates and compacts the snow and also provides a component of the total vehicle traction. By using vehicle engine power rather than vehicle traction to drive the snow processing apparatus, the vehicle is enabled to process snow while moving in either an uphill or a downhill direction, even in relatively steep terrain.

BRIEF DESCRIPTION OF THE DRAWINGS

An illustrative and presently preferred embodiment of the invention is shown in the accompanying drawing in which:

FIG. 1 is a front elevation view of a wheel-driven snow grooming vehicle provided with dual wheels and wrap-tracks.

FIG. 2 is a rear elevation view of the snow grooming vehicle of FIG. 1.

FIG. 3 is a right-side elevation view of the snow grooming vehicle of FIGS. 1 and 2.

FIG. 4 is a left-side elevation view of the snow grooming vehicle of FIGS. 1–3.

FIG. 5 is a front elevation view of the snow grooming vehicle of FIGS. 1-4 with wrap-tracks removed and with portions of dual-wheel connectors cut away to expose rearwardly positioned dual-wheel connectors and showing further snap-on wheels in phantom.

FIG. 6 is a front elevation view of the snow grooming vehicle of FIG. 5 with snap-on wheels removed.

FIG. 7 is a left-side cut-away elevation view of the snow grooming vehicle of FIGS. 1–4.

FIG. 9 is a schematic plan view of a snow grooming vehicle primary braking assembly.

FIG. 10 is a schematic plan view of a snow grooming vehicle four-wheel steering assembly.

FIG. 11 is a side elevation view of a snow grooming vehicle inflatable-tire-mounted dual-wheel pair with a wrap-track assembly installed thereon.

FIG. 12 is a front elevation view of FIG. 11.

FIG. 14 is a detail side elevation view of a conventional crawler snow tractor cleat design.

FIG. 15 is a detail side elevation view of a wheel-driven vehicle wrap-track cleat design.

FIG. 16 is a side elevation view of a snow processing apparatus in a blading operating state.

FIG. 17 is a top plan view of FIG. 16.

FIG. 18 is a front elevation view of FIG. 16.

FIG. 19 is a side elevation view of the snow processing apparatus of FIG. 16 in a snow compacting and traction enhancing operating state.

FIG. 20 is a schematic top plan view of a snow grooming vehicle traversing a snow processing path.

FIG. 21 is a detail perspective view of a wrap-track lateral holding device.

FIG. 22 is a backside elevation view of a wrap-track holding device.

DETAILED DESCRIPTION OF THE INVENTION

Figure 13:
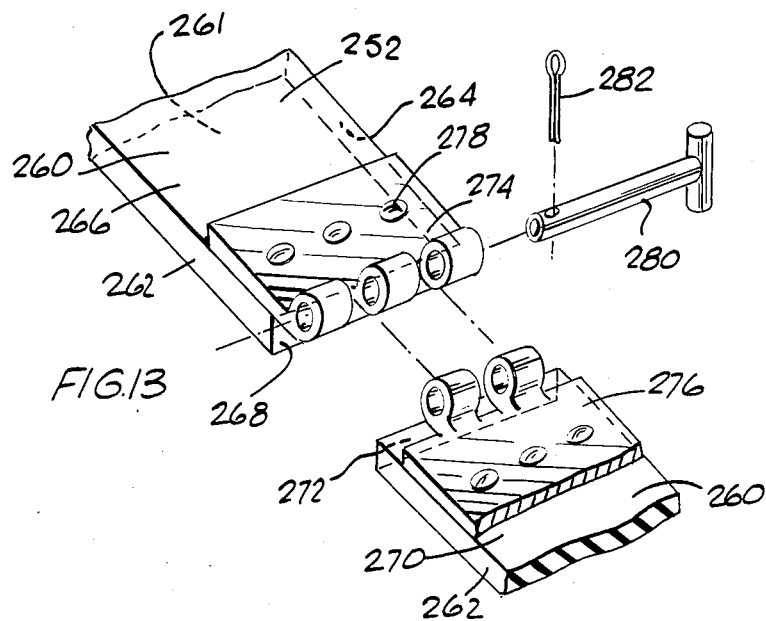
FIG. 13 is a perspective, exploded view of a wrap-track connecting assembly.
Figure 8:
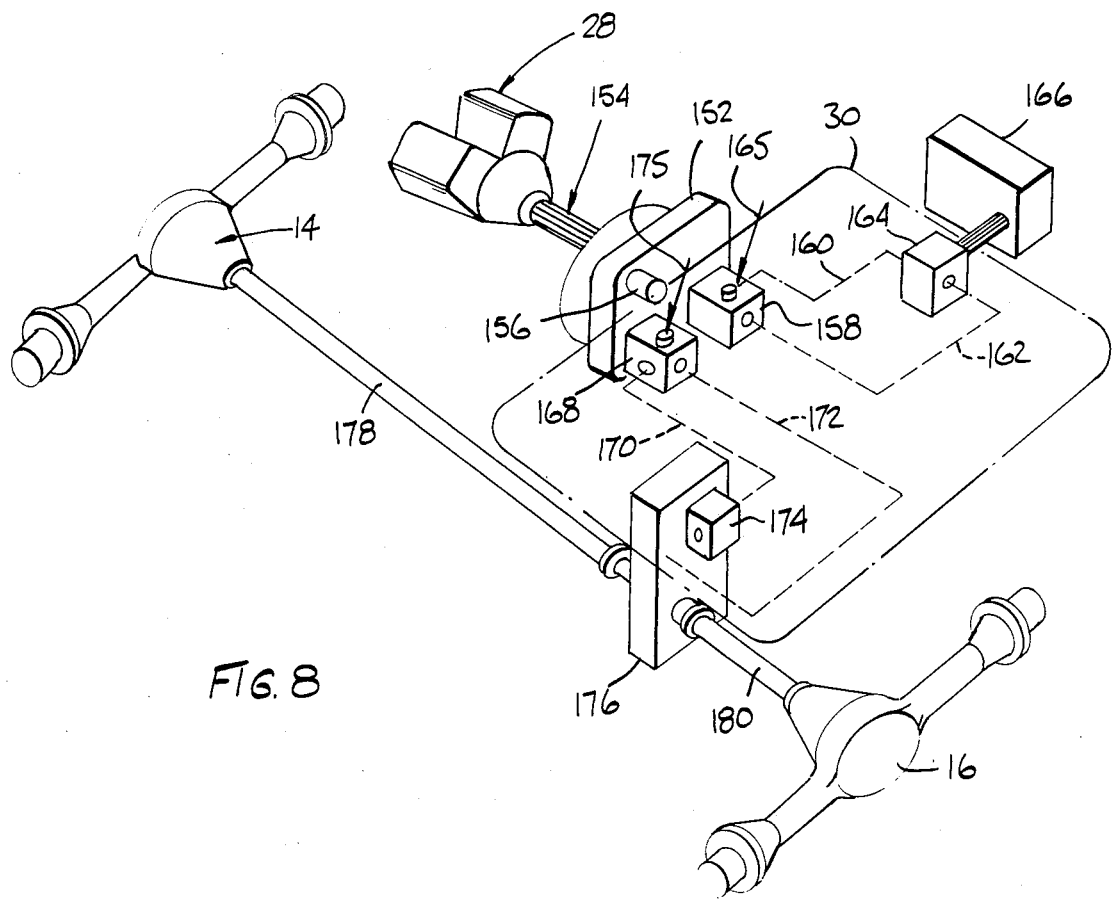
FIG. 8 is a schematic view of a snow grooming vehicle drive assembly.

The present invention is directed to a wheel-driven vehicle 10 for use in ski-area winter snow grooming operations and the like and also for use in maintenance operations in mud or hard surface operating conditions during the off-season. The vehicle 10 has a central longitudinal axis XX extending between a front end portion 11 and a rear end portion 13 thereof, FIG. 7, a central lateral axis YY extending between a left side portion 15 and a right side portion 17 thereof, FIG. 6, and a vertical axis ZZ extending between a top portion 19 and a bottom portion 21 thereof, the three axes XX, YY, and ZZ being perpendicular to one another and intersecting at a vehicle center of gravity 23, FIG. 7. The vehicle 1 of the present invention, in general, includes a rigid (nonarticulated) chassis 12, FIG. 7, having a pair of longitudinal frame members 29 (only one shown) defining a central longitudinal chassis axis QQ aligned in generally parallel relationship with vehicle axis XX and vehicle supporting base surface 37 and having a front portion 25, a rear portion 27, and an intermediate portion 29. The vehicle has a front axle assembly 14 fixedly mounted o the front portion 25 of the chassis and a rear axle assembly 16 flexibly mounted on the rear portion 27 of the chassis by a conventional rear axle pivot assembly 31 which enables the rear axle to pivot about a central longitudinal pivot axis, which extends parallel to axes XX and QQ, to facilitate operation in laterally sloping, uneven terrain. Such flexible rear axle mounting is known in the heavy machinery arts. A first pair of inflatable-tire-carrying front wheels 18, 20 are operably, pivotally and rotatably mounted at opposite end portions of the front axle, FIGS. 1, 6 and 10. A first pair of inflatable-tire-carrying rear wheels 22, 24 operably, pivotally and rotatably mounted at opposite end portions of the rear axle, FIGS. 2 and 10. The wheel assemblies provide a minimum clearance between the vehicle bottom 21 and a supporting base surface such as snow 37 of between 1 ft. and 1.5 ft., and most preferably about 1 ft. A four-wheel steering assembly 26 is provided for pivoting the front and rear wheels for steering the vehicle, FIG. 10. The vehicle has an internal combustion engine, FIGS. 7 and 8, for providing power to operate the vehicle and attached implements. The engine is fixedly mounted on the chassis at the intermediate portion 29 thereof. A hydrostatic transmission assembly 30, FIG. 8, is provided for transferring power from the internal combustion engine to the first pair of front wheels 18, 20 and the first pair of rear wheels 22, 24 for providing operator-selectable, infinitely variable wheel speed adjustment and for providing engine-hold-back type braking of the vehicle in addition to braking provided by a primary braking assembly. A primary braking assembly 32, FIG. 9, is operably associated with the first pair of front wheels and the first pair of rear wheels for providing operator selectable, primary braking of the vehicle. A vehicle body 34 is fixedly mounted on the chassis 12 for enclosing various vehicle components and includes a high visibility operator cab 36 for enabling an operator seated in a normal operating position in the cab to unobstructively view a portion of a generally planar base surface 37 on which the vehicle is positioned which is as little as 8 ft. in front of the vehicle or which is as little as 8 ft. behind the vehicle. The viewing position of an operator in the cab is at least 8 to 10 ft. above the base surface 37 supporting the vehicle and is preferably about 9 ft. above base surface 37. The vehicle includes operator controls 38 located in the cab for enabling an operator to control the vehicle. The vehicle center of gravity 23 is located at approximately mid-distance between the front and rear axles 14, 16 and at a height above a planar base surface 37 upon which the vehicle is supported of between 3 ft. and 4 ft., and most preferably about 3.5 ft. The first pair of front wheels 18, 20 and the first pair of rear wheels 22, 24 define a wheel base having a longitudinal dimension of preferably between 10 ft. and 14 ft., and most preferably about 11 ft. The wheel base has a transverse dimension at the centerline of the tires of preferably between 6.5 ft. and 9 ft., and most preferably about 7 ft., and has a longitudinal dimension to transverse dimension ratio of between 1.11 and 2.15, and most preferably about 1.57. The phrase "wheel base" as used herein refers to the entire generally rectangular area defined by the centerline of each wheel at its point of contact with a planar support surface. The vehicle unloaded and unfueled weight or "dry weight" is preferably between 8,000 lbs. and 12,000 lbs., and is most preferably about 9,000 lbs. The internal combustion engine has an SAE (Society of Automotive Engineers) power rating of preferably between 200 hp and 300 hp, and most preferably 250 hp. The vehicle preferably has a power-to-weight ratio of between 0.0167 hp/lb. and 0.0375 hp/lb., and most preferably 0.0278 hp/lb.

The vehicle 10 may also have a second pair of inflatable-tire-carrying front wheels 42, 44, FIGS. 1 and 5, adapted for rapid, snap-on connection to the first pair of front wheels 18, 20 in coaxial alignment therewith for providing a front, left-side dual-wheel pair 18, 42 and a front, right-side dual-wheel pair 20, 44 and may have a second pair of inflatable-tire-carrying rear wheels 46, 48, FIG. 2, adapted for rapid snap-on connection to the first pair of rear wheels 22, 24 in coaxial alignment therewith for providing a rear, left-side dual-wheel pair 22, 46 and a rear, right-side dual-wheel pair 24, 48. Conventional snap-on connector couplings 50–53, FIG. 5, are provided for coupling the first pair of front wheels to the second pair of front wheels and for coupling the first pair of rear wheels to the second pair of rear wheels. The second pair of front wheels and the second pair of rear wheels preferably broaden the vehicle wheel base by between 30% and 60%, and most preferably about 50%. A third set of wheels 43, 45, etc., (only two shown) may be snapped on to each dual-wheel pair with couplings 57, 59, etc., as shown in phantom in FIG. 5, to further broaden the wheel base.

The invention may also include wrap-track assemblies 60, 62, 64, 66 operably mounted on each of the dual-wheel pairs (or three-wheel sets or single-wheel sets) for increasing gripping contact between the wheels and a base surface 37 such as snow upon which the vehicle is supported.

The invention may also include a unitary snow processing assembly 70, FIGS. 16–20, operably mountable on the vehicle 10 for grooming snow along a snow grooming path 72, FIG. 20, selected by the vehicle operator. Such a snow processing assembly may comprise a snow blading state for removing, pulverizing, and redistributing hard-packed snow encountered in the snow grooming path and a snow compacting state for engaging and compressing powder snow and lightly-packed snow encountered in the snow grooming path.

Having thus described the wheel-driven snow grooming vehicle 10 and attachments therefor in general, certain specific features of the vehicle 10 will now be described in further detail.

As illustrated in FIGS. 4 and 6, each of the inflatable-tire-carrying wheel assemblies 18, 20, 22, 24 may include a conventional metal wheel 80 mountable by bolts 81, or the like, to an axle assembly hub portion. The wheel may comprise a diameter of 2 ft. to 3 ft. Each inflatable-tire-carrying wheel assembly also comprises an inflatable tire 82 which may have a maximum fully-inflated diameter of 4.5 to 5.5 ft. The inflatable tire 82, as illustrated in FIGS. 6 and 12 comprises a conventional torus-like configuration including a generally cylindrical, axially and circumferentially extending tread-carrying surface portion 84 which normally engages the base medium 37 which supports the vehicle and a pair of radially and circumferentially extending lateral sidewall surfaces 86, FIG. 4, 88, FIG. 11.

The four-wheel steering assembly 26 is illustrated in schematic form in FIG. 10. Each wheel is attached for pivotal movement about an associated axle end by a pivot assembly 102 to enable pivoting movement in a generally horizontal plane, as illustrated at 104. Each wheel assembly, e.g. front left wheel assembly 18, has a hydraulic steering cylinder 106 associated therewith having a first end 108 connected to the wheel and a second end 110 connected to the vehicle chassis 12. The hydraulic cylinder 106 has a first hydraulic fluid line 112 connected to a first, outwardly positioned cylinder port 114 and a second hydraulic fluid line 116 connected to a second, inwardly positioned cylinder port 118. Hydraulic fluid lines 112 and 116 are also connected to front, right cylinder 120, except that the port positions are reversed from that of hydraulic cylinder 106, i.e. inner port 122 is connected to line 116, and outer port 124 is connected to line 112. Hydraulic fluid lines 112 and 116 are connected to a front wheel hydraulic control valve assembly 126 which may be actuated to cause fluid flow through lines 112, 116 in two different directions and at different rates of speed for causing coordinated pivotal movement of wheel assemblies 18 and 20. A rear wheel hydraulic control valve assembly 128 is provided for controlling rear cylinders 131 and 133 in a manner identical to that described with respect to the front cylinders except that wheel assemblies 22, 24 are controlled to pivot oppositely of the direction of pivotal movement of front wheel assemblies 18 and 20. The front and rear hydraulic control valve assemblies 126, 128 receive a circulation of hydraulic fluid from hydraulic pumping unit 130 through hydraulic fluid lines 135, 137. Steering control signals 132, 134 are provided to front and rear hydraulic control valve assemblies 126, 128, respectively, from a steering control unit 136. Steering control unit 136 is, in turn, actuated by steering wheel 138 or steering control levers (not shown). A steering selector switch assembly 140 which is operatively associated with control unit 136 may be provided to enable an operator to select a first switch position 142 for providing four-wheel steering, a second switch position 144 for providing only front-wheel steering, and a third switch position 146 for providing only rear-wheel steering. Such selectable four-wheel steering for wheel-driven vehicles such as trucks and the like is well-known in the art.

Internal combustion engine 28 illustrated in FIGS. 7 and 8 is preferably a commercially available diesel engine such as a Caterpiller V-8 Model 3208 diesel engine having an SAE-rated horse power of 250 hp.

The hydrostatic transmission assembly 30 illustrated in FIGS. 7 and 8 may comprise a pump drive gear box unit 152 which is driven by internal combustion engine 28 through a conventional drive linkage 154. Pump drive gear box unit 152 drives a power-steering and accessory hydraulic pump 156. Pump drive gear box 152 also drives an auxiliary-drive hydrostatic pump 158 having hydraulic fluid lines 160 and 162 provided for connecting the auxiliary-drive hydrostatic pump 158 to an auxiliary-drive hydrostatic motor 164. Hydrostatic pump 158 is controlled through a control signal 165 generated by an operator-movable control lever in the vehicle cab. The auxiliary-drive hydrostatic motor 164 is operably, mechanically connected to a mechanical connection terminal 166 which may be coupled to various vehicle attachments such as snow processing unit 70 for providing mechanical power thereto. Pump drive gear box 152 also drives a wheel drive hydrostatic pump 168 connected by hydraulic fluid lines 170 and 172 to wheel drive hydrostatic motor 174. Wheel drive hydrostatic pump 168 is reversibly speed-controlled by a control signal 175 in response to actuation of a cab-mounted control pedal by the vehicle operator. A conventional drop box transmission 176 is provided for gearing down the output of wheel-drive hydrostatic motor 174 and provides a mechanical output to front axle assembly 14 and rear axle assembly 16 through mechanical drive lines 178 and 180, respectively. Hydrostatic transmission assemblies 30 such as described above have been used on a variety of vehicles and are well-known in the art.

The primary braking assembly 32, which is illustrated in FIG. 9, may comprise a conventional cab-mounted brake pedal 192 which transmits pressure through a hydraulic line system 194, which receives hydraulic fluid from hydraulic reservoir 196, to hydraulically-actuated brake shoe assemblies 198, 200, 202, 204. The primary braking assembly 32 is conventional and well-known in the art.

Vehicle body assembly 34 may comprise a forwardly and downwardly sloping front hood portion 212, FIG. 7, having an upper front terminal edge portion 214 positioned at least 3.5 ft., and preferably about 4 ft., below the elevation of a designed-for-operator eye-level elevation 216. This designed-for-operator eye-level elevation 216 is preferably at least 8 ft., and preferably about 9 ft., above a base medium 37 upon which the vehicle rests. The operator position is designed to be located longitudinally approximately mid-distance between the axle assemblies 14 and 16. The vehicle body assembly may also comprise a rearwardly and downwardly sloping rear hood portion 218 having an upper rear terminal edge portion 220 positioned at least 3.5 ft., and preferably about 4 ft., below the elevation of the designed-for-operator eye-level elevation 216.

As illustrated in FIG. 7, the operator control means 38 may include brake pedal 192, steering wheel 138, wheel speed control pedal 232, a forward and reverse lever 234, and other conventional operating controls. Operator seat 236 is vertically adjustable to provide an optimum operator viewing position.

The wrap-track assembly 60 will no be described with reference to FIGS. 11–15. Each wrap-track assembly 60 is adapted to be mounted on a dual-wheel pair, e.g. 18, 42, having a common wheel axis AA. Each wrap-track comprises a first, second, third, and fourth elongate strip 252, 254, 256, 258. The elongate strips may be identical and may each comprise a top surface 260, a bottom surface 261, a first lateral side surface 262, a second lateral side surface 264, a first end portion 266 terminating in a first end surface 268, and a second end portion 270 terminating in a second end surface 272. Each strip end portion 266, 270 has one of a pair of mating hinge portions 274, 276 fixedly mounted thereon as by bolts 278. The hinge portions 274, 276 may be connected by a pin 280 which may be secured in position by a cotter pin 282. Each elongate strip has a generally uniform width, e.g. 8 in., extending between the lateral side surfaces 262, 264 and which is substantially less than one-half the axial dimension of an associated tire, generally cylindrical surface 84. Each elongate strip has a generally uniform thickness, e.g. 0.75 in., extending between the top and bottom surfaces which is substantially less than the elongate strip width. Each strip member 252, 254, 256, 258 is preferably constructed from a plurality of substantially nonextensible, longitudinally extending strands such as steel wire or Kevlar ® strands embedded in a resilient matrix such as tire-grade rubber or polyester.

The strip members 252, 254, 256, 258 are positioned in encircling relationship about an associated dual-wheel pair, e.g. 18, 42. Strip member 252 is positioned axially such that it lies proximate and entirely or nearly entirely axially outwardly of an exteriorly positioned lateral side surface of a tire 80A on wheel assembly 42. Strip member 254 is positioned to lie proximate and entirely, or nearly entirely, axially outwardly of an interiorly positioned lateral side surface of tire 80A. Strip member 256 is positioned to lie proximate and entirely, or nearly entirely, axially outwardly of an interior lateral side surface of tire 80B, and strip member 258 is positioned to lie proximate and entirely, or nearly entirely, axially outwardly of an exterior lateral side surface of tire 80B.

The wrap-track assembly 60 also comprises a plurality of circumferentially spaced-apart, axially extending cleat members 292, 294, 296, 298, etc., fixedly attached to the elongate strips 252, 254, 256, 258 for penetrating and engaging the base surface 37 below the associated dual wheels, e.g. 18, 42. Each of the cleat members are elongated axially extending members having a first end portion 302 and a second end portion 304 and an intermediate portion 306, FIG. 12. The first end portion 302 is fixedly attached to the first elongate strip 252, the second end portion 304 is fixedly attached to the fourth elongate strip 258 the intermediate portion 306 is fixedly attached to the second and third elongate strip 254, 256. Each elongate cleat member comprises a generally uniform, circumferentially and axially extending base portion 310, FIG. 15, constructed from relatively stiff material, e.g. 0.25 in. thick steel. The base 310 may be attached to the strips 252, 254, 256, 258 by a plurality of bolt assemblies 352 or other conventional attachment means. The base 310 is adapted to abuttingly engage and stiffen an associated underlying portion 312 of each of the strips and is adapted to abuttingly engage an underlying portion of tire-treaded surface 84 for preventing rolling movement 314 of the cleat member about an axis DD parallel to the wheel axis AA during penetration and engagement of the vehicle supporting base medium 37 by the cleat member. Each cleat member also comprises a generally radially outwardly extending blade portion 316 fixedly attached to the base portion for penetrating the snow or other base medium 37 and for engaging the penetrated vehicle supporting base medium, e.g. medium generally vertical surface portion 318, FIG. 11, for providing traction.

The blade portion 316 may have an inverted Y-shaped cross section including a first leg portion 322 having a first end 324 and a second end 326; a second leg portion 328 having a first end 332 and a second end 334; a trunk portion 336 having a first end 338 and a second end 340. The first leg portion first end 324 and the second leg portion first end 332 are fixedly attached to the base 310. The first leg portion second end 326 and the second leg portion second end 334 are fixedly attached to the trunk portion first end 338.

The trunk portion 336 may be approximately 2 in. in length. Each of the leg portions may be approximately 2 in. in length and may be integrally formed with the trunk portion and base portion. The leg portions may intersect one another at an angle of approximately 60°. The base 310 may have a circumferentially extending uniform dimension of between 4 in. and 6 in., and most preferably approximately 5 in.

A prior art cleat design for a crawler-type tractor track is shown in FIG. 14 and comprises a cleat 360 with a hook-shaped cross section having an axially extending shank portion and a generally C-shaped base portion 364 which is bolted by bolt assembly 368 to an associated track strip 370 in alignment with the axis HH of shank 362. Such a configuration tends to roll about an axis JJ when shank 360 engages snow beneath the vehicle producing fracture of snow bonds and thus loss of lateral support for shank 360. The cleat 298 of the present invention overcomes this problem.

As best shown in FIGS. 21 and 22, the wrap-track assembly also comprises a plurality of wrap-track axial holding devices 380, 382, 384, etc., which prevent a wrap-track assembly 60 from moving axially with respect to a dual-wheel pair upon which it is mounted. Each holding device 380, 382, 384, etc., may comprise a generally L-shaped cross section and includes: a first, generally rectangular plate portion 381 which is adapted to extend generally axially and circumferentially with respect to the axis AA, FIG. 11, of an associated dual-wheel pair; a second, generally trapezoidal plate portion 383 fixedly attached at a right angle to the first plate portion 381 and adapted to extend generally radially and circumferentially with respect to the axis of an associated dual-wheel pair; and a third, generally triangular bracing plate portion 385 fixedly attached at right angles to mid portions of both the first and second plate members and adapted to extend generally radially and axially with respect to the axis of an associated dual-wheel pair. The holding devices are fixedly attached to strips 254 and 256 with an upper surface of plate portion 381 positioned in abutting contact with the bottom surface 261 of the associated strip. Plate portion 381 may comprise a plurality of holes therein adapted to receive bolt assemblies 352, located at an intermediate portion 306 of an associated cleat member 298, therethrough for securing the holding device to the associated strip. Two holding devices are associated with each cleat member 298. The axial positioning of each holding member, e.g. 380, and an associated inwardly positioned strip member, e.g. 254, are such that a surface 389 of holding member plate portion 383 which is on the side opposite to the surface attached to plate 385 is positioned immediately adjacent to an interior lateral side surface 88 of an associated tire, e.g. 80A, and abuttingly engages the tire lateral side surface 88 to limit lateral shifting movement of the wrap-track assembly in an axial direction toward the associated tire, e.g. 80A. A pair of holding devices, e.g. 380, 380A, FIG. 12, are associated with each cleat member, e.g. 298, and the interior lateral surfaces 88 of the two tires 80, 80A of each dual-wheel pair and thus limit axial shifting movement of the wrap-track assembly 60 in both axial directions. The holding devices may be axially located to enable a small amount of lateral shifting movement. The axial shifting movement of a wrap-track 60 which is permitted by the spacing of the holding devices may be, e.g., 2.0 in. to accommodate tire irregularities, etc.

Snow processing apparatus 70 will now be described. Snow processing apparatus 70 is adapted for use on a powered vehicle 10 for processing snow lying in a snow processing path traversed by the powered vehicle 10, FIG. 20. Snow processing apparatus 70 comprises a first snow deflecting assembly 402 for deflecting snow 404 received therein into a second snow deflecting means 406. The first snow deflecting means 402 extends transversely of the snow processing path 72 and defines the width of the snow processing path. The first snow deflecting assembly has a top portion 410, a bottom portion 412, a front portion 414, a back portion 416, a first lateral end portion 418, and a second lateral end portion 420. The first snow deflecting assembly also comprises a paddle wheel-like rotatable snow engaging assembly 422 rotatably mounted on a forward portion of the fist snow deflecting assembly 402, as by members 401, 403, and extending between the first and second lateral end portions 410, 412 thereof. The rotatable snow engaging assembly 422 comprises a rotating drum 424 having a central axis of rotation MM extending transversely of the snow processing path 72 and comprises a plurality of parallel, radially projecting blades 426, 428, 430, etc., extending parallel to the drum central axis of rotation MM and fixedly mounted on the drum for penetrating into snow 404 in the snow processing path 72 and for rapidly moving snow into the first snow deflecting assembly 402 during a snow blading operating state, FIG. 16, and for compacting snow and providing additional traction for pulling the attached vehicle 10 forwardly along the snow processing path 72 during a snow compacting operating state, FIG. 19. The snow processing apparatus also comprises drive means (such as a hydraulic axial piston motor of the type sold under the part name MCH6 by Rexroth Hydraulics of Wooster, Ohio) operatively associated with the rotatable snow engaging assembly for rotating the rotatable snow engaging assembly at a relatively rapid rate during the snow blading operating state and for rotating the rotatable snow engaging means relatively slowly during the snow compacting state. The snow processing apparatus drive means may be operably linked to the vehicle drive assembly 30, FIG. 8, such as by hydraulic lines 441, 443. The snow processing apparatus also comprises an attachment assembly 440 for shiftably, pivotally attaching the first snow deflecting assembly 402 to the vehicle 10 for enabling selectively pivotal movement of the first snow deflecting assembly 402 about a shiftable pivot axis LL extending transversely of the snow processing path 72. The assembly is pivotal between an upright position, FIG. 16, associated with the snow blading operating state and a forwardly tilted position, FIG. 19, associated with the snow compacting operating state.

Attachment assembly 440 may comprise a pair of upper clevis members 442 (only one shown) which ar fixedly attached to an upper back surface portion of the first snow deflecting assembly 402 and which are adapted to receive pin members 444 (only one shown) therein for pivotally securing one end portion 446 of associated hydraulic cylinders 448, 450 to the first snow deflecting assembly 402. The second ends 452, 454 of cylinders 448, 450 are pinned to a pair of clevis members 456, 458 mounted on an upper portion of the tractor 10 by a pair of pins 460 (only one shown). A lower pair of clevis members 462 (only one shown) are similarly pinned to a pair of hydraulic cylinders 464 (only one shown) which are also pinned to a pair of clevis members 466 (only one shown) mounted on tractor 10 immediately below clevis members 456, 458. A pair of fixed-length bar members 470 (only one shown) are pinned between clevis members 462 and a clevis member 472 on a lower portion of tractor 10. By shortening hydraulic cylinder pair 464, etc., and extending cylinder pair 448, 450, the first snow deflecting assembly 402 is caused to pivot forwardly from the position shown in FIG. 16 to that shown in FIG. 19.

In the blading position shown in FIG. 16, snow is swept into unit 402 and is deflected upwardly by a curved interior rear surface 473 thereof. In the snow compacting state shown in FIG. 19, blades 428, 430, etc., drive downwardly into the snow 404, compacting the snow in a saw tooth pattern as shown at 474, 476, etc., and simultaneously pushing against the rear lateral side surface of the saw tooth-shaped indentations to provide forward traction for the associated tractor 10.

The snow processing apparatus 70 may further comprise a second snow deflecting assembly 480 operably mounted on an upper portion of the first snow deflecting assembly 402 and extending between the first and second lateral ends 418, 420 thereof for receiving snow from the first snow processing assembly 402 during blade operation and for adjustably, laterally deflecting the snow to a selected location adjacent to the snow processing path 72.

The second snow deflecting assembly 480 comprises a chute 482 pivotally mounted as by pin assembly 484, etc., on the first snow deflecting assembly and adjustably, pivotally positionable about a transversely extending pivot axis NN defined by pin assembly 484 between a first position, FIG. 16, for directing snow in a generally forwardly and upwardly direction during the snow blading state and also for adjusting snow casting distance during blading operation; and a second position, FIG. 19, in retracted, noninterfering relationship with snow in the snow processing path during the snow compacting state. Pivotal movement is achieved by hydraulic cylinders 486, 488 mounted between clevis pairs 481, 483 and 485, 487, respectively. The second snow deflecting assembly 480 also comprises adjustable louvers 490, 492, 494, etc., pivotally mounted in the chute 482 and pivotal about a plurality of parallel pivot members 496, 498, 500 extending generally perpendicularly to the chute pivot axis NN for adjustably, laterally deflecting snow received in the chute.

The adjustable louvers may include a first set of louvers 496, 498, 500, etc., located between a first lateral end portion 502 of the chute means and a mid-portion 504 thereof which are adjustable in unison by a first louver control device 506 which may include a hydraulic cylinder 500 attached at one end to chute 482 and at the other end to a rod 508 which is in turn attached to a plurality of connecting shafts 510, 512, 514, etc., which pass through slots 516, 518, 520, etc., and are also connected to the lower ends of louvers 490, 492, 494, etc. A second set of louvers 532, 534, 536, etc., positioned between mid-portion 504 and end portion 505 may be similarly actuated in unison by a second louver control device 536, etc., independently from the first set of louvers.

The snow processing apparatus 70 may also comprise a snow depth control assembly 550 adjustably pivotally mounted on a bottom forward portion of the first snow deflecting assembly as by pin assembly 552 for use in the snow blading operating state for selectively controlling the depth of penetration of the snow processing apparatus into snow in the snow processing path.

The depth control assembly 550 may extend the full width of the first snow deflecting assembly 402 and may have a cross section comprising a leading edge portion 560, an intermediate body portion 562, and a trailing edge portion 564. The leading edge portion may have a generally flat bottom surface 566 and an upwardly and rearwardly extending top surface 568 intersecting the bottom surface at the forward end of the leading edge portion. The depth control assembly may be pivotally attached to the first snow deflecting assembly 402 at a position on the snow depth control assembly located immediately rearwardly of the leading edge portion 560. The depth control assembly may be pivotally attached at the trailing edge portion 564 to a first end portion 572 of a variable length device such as hydraulic cylinder 574 which is pivotally attached at a second end portion 576 thereof to the rear portion of the first snow deflection assembly 402 as by clevis and pin assembly 578. To force the snow processing apparatus 70 deeper into the snow, cylinder 574 is retracted. To relatively raise the apparatus in the snow, cylinder 576 is extended.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A snow processing apparatus for use on a powered vehicle for processing snow lying in a snow processing path traversed by the powered vehicle, comprising:
  (a) first snow deflecting means for deflecting snow received therein into a second snow deflecting means, said first snow deflecting means extending transversely of said snow processing path and defining the width of said snow processing path, said snow deflecting means having a top portion, a bottom portion, a front portion, a back portion, a first lateral end portion, and a second lateral end portion;
  (b) rotatable snow engaging means rotatably mounted on a forward portion of said first snow deflecting means and extending between said first and second lateral end portions thereof; said rotatable snow engaging means comprising:
    (i) a rotating drum means having a central axis of rotation extending transversely of said snow processing path for supporting blade means; and
    (ii) a plurality of parallel, radially projecting blades extending parallel to said drum means central axis of rotation and fixedly mounted on said drum means for penetrating into snow in said snow processing path and for rapidly moving snow into said first snow deflecting means during a snow blading operating state and for compacting snow and providing additional traction for pulling said vehicle forward along said snow processing path during a snow compacting operating state;
  (c) drive means operatively associated with said rotatable snow engaging means for rotating said rotatable snow engaging means at a relatively rapid rate during said snow blading operating state and for rotating said rotatable snow engaging means relatively slowly during said snow compacting state;

(d) attachment means for pivotally attaching said first snow deflecting means to said vehicle for enabling selectively pivotal movement of said first snow deflecting means about a pivot axis extending transversely of said snow processing path between an upright position associated with said snow blading operating state and a forwardly tilted position associated with said snow compacting operating state.

2. The invention of claim 1 further comprising:

second snow deflecting means operably mounted on an upper portion of said first snow deflecting means and extending between said first and second lateral ends thereof for receiving snow from said first snow processing means and adjustably, laterally deflecting said snow to a selected location adjacent to said snow processing path.

3. The invention of claim 2, said second snow deflecting means comprising:

(a) chute means pivotally mounted on said first snow deflecting means and adjustably, pivotably positionable about a transversely extending pivot axis between a first position for directing snow in a generally forwardly and upwardly direction and for controlling snow casting distance during said snow blading state and a second position in noninterfering relationship with snow in said snow processing path during said snow compacting state;
   (b) adjustable louver means pivotally mounted in said chute means and pivotal about a plurality of pivot axes extending generally perpendicularly to said chute pivot axis for adjustably, laterally deflecting snow received in said chute means.

4. The invention of claim 3, said adjustable louver means comprising:

(a) a first set of louvers located between a first lateral end portion of said chute means and a mid-portion thereof which are adjustable in unison by a first louver control device; and
   (b) a second set of louvers located between a second lateral end portion of said chute means and a midportion thereof which are adjustable in unison by a second louver control device independently from said first set of louvers.

5. The invention of claim 1 comprising:

snow depth control means adjustably pivotally mounted on a bottom forward portion of said first snow deflecting means for use in said snow blading operating state for selectively controlling the depth of penetration of said snow processing apparatus into snow in said snow processing path.

6. The invention of claim 5, said depth control means having a cross section comprising:

(a) a leading edge portion;
   (b) an intermediate body portion;
   (c) a trailing edge portion;
   (d) said leading edge portion having a generally flat bottom surface and an upwardly and rearwardly extending top surface intersecting said bottom surface at the forward end of said leading edge portion;
   (e) said depth control means being pivotally attached to said first snow deflecting means at a position on said snow depth control means located immediately rearwardly of said leading edge portion.

7. The invention of claim 6, said depth control means being pivotally attached at said trailing edge portion thereof to a first end portion of a variable length device which is pivotally attached at a second end portion thereof to said rear portion of said first snow deflection means.

* * * * *